United States Patent [19]

Rose

[11] 3,882,686
[45] May 13, 1975

[54] METHOD AND APPARATUS FOR COOLING EGGS

[76] Inventor: Boyd W. Rose, 5413 Granada St., Riverside, Calif. 92504

[22] Filed: Dec. 26, 1973

[21] Appl. No.: 427,741

[63] Continuation of Ser. No. 205,154, Dec. 6, 1971, abandoned.

[52] U.S. Cl. .................... 62/63; 62/380; 426/298; 426/300; 426/524
[51] Int. Cl. ........................................... F25d 13/06
[58] Field of Search .......... 62/63, 380; 99/177, 192, 99/196, 241; 198/154, 24; 426/298, 524, 300

[56] References Cited
UNITED STATES PATENTS

| 1,250,540 | 2/1917 | Young | 198/154 X |
| 1,322,279 | 11/1919 | Allsop et al. | 198/154 X |
| 1,863,484 | 6/1932 | Jones | 62/380 X |
| 1,891,425 | 12/1932 | Kronquest | 62/380 X |
| 1,892,224 | 12/1932 | Sorber | 62/380 X |
| 2,221,343 | 11/1940 | Mulvany | 99/196 X |
| 2,275,588 | 3/1942 | Greene | 62/380 X |
| 3,166,175 | 1/1965 | Kurtz et al. | 198/154 X |
| 3,470,996 | 10/1969 | Lee et al. | 198/24 |
| 3,623,591 | 11/1971 | Koch et al. | 198/24 |

Primary Examiner—Meyer Perlin
Assistant Examiner—Ronald C. Capossela
Attorney, Agent, or Firm—R. S. Kelly; C. E. Tripp

[57] ABSTRACT

A continuously moving endless conveyor moves through a series of vertical runs in a cooling room and is provided with a plurality of uniformly spaced carriers each of which has a plurality of pockets for receiving eggs. The carriers are supported by the conveyor so that they normally maintain a constant spacial orientation except during pickup and discharge of the eggs. The eggs are delivered to the carriers while they are moving vertically upward by tilting the carriers to allow them to receive the eggs, and the eggs are discharged from the carriers by tilting them outwardly and sweeping a pusher member across the pockets. The eggs are both delivered to the carriers and received from the carriers by conventional pocketed roller conveyors.

19 Claims, 7 Drawing Figures

METHOD AND APPARATUS FOR COOLING EGGS

CROSS-REFERENCE TO RELATED APPLICATION

The present application is a continuation of application Ser. No. 205,154 filed on Dec. 6, 1971 now abandoned.

BACKGROUND OF THE INVENTION

1. Field of the Invention

In general, this invention pertains to that field of art concerned with the methods of and the apparatus for cooling eggs, and more particularly, it pertains to egg cooling apparatus which utilizes a continuously moving conveyor for transporting eggs through an area where they are subjected to cooling temperatures.

2. Description of the Prior Art

In recent years with the general movement toward mechanization of the egg producing industry, various systems have been suggested or devised for providing for the automatic handling of eggs from the time that the eggs are layed by the chicken to the time that they are packed into the cartons which ultimately find their way to the supermarket shelf. Obviously, one of the prime requirements in any automatic egg handling system is that the eggs be handled in a minimum amount of time so that the desirable qualities of the egg, which are subject to rapid deterioration, are maintained in the highest possible condition until the eggs can be marketed. Since eggs which are freshly laid by the chicken are at approximately the body temperature of the chicken, these eggs must be subjected to some cooling procedure before they can be packed since, if the eggs are packed hot, they are subject to deterioration due to the slow cooling out process and the accompanying excess evaporation losses. Consequently, various prior art schemes have been devised for providing for the cooling of eggs prior to the packing thereof in closed containers.

When the eggs are gathered in a normal ranch type operation, they are stored in cold rooms and are then transported to the packing plant after the egg temperature has dropped to an acceptable level for packing. However, when it is desired to have an inline egg handling system, i.e., a system wherein the eggs are generally continuously moved from the chicken to the packing equipment, some in-line method of cooling the eggs must be provided. In one prior art system, such a method is provided by a wind tunnel wherein the eggs are placed upon conventional grooved rollers and are conveyed through a tunnel wherein they are subjected to continuous high velocity blasts of frigid air. It will be appreciated that if the cooling air currents are at a temperature wherein the eggs will cool at a reasonable rate and thereby achieve a uniform cooling effect, the conveyor tunnel must be of a considerable length, and this poses a problem for most egg packing installations wherein the space required for such a tunnel is just not available. If the tunnel is shortened to a reasonable length to be accommodated by the typical egg packing house, forced blasts of air at such a low temperature are required that the eggs do not cool uniformly and hot spots are left in the center of the egg which later subject the egg to rapid deterioration. Also, such rapid cooling techniques have been found to have a deteriorative effect upon the egg conveying equipment.

SUMMARY OF THE INVENTION

With the method and apparatus of the present invention a continuously moving conveyor is provided which is adapted to receive a row of eggs at a delivery station and to carry the eggs through a series of closely-spaced substantially parallel runs while the eggs are subjected to cooling temperatures. The eggs will then be removed from the conveyor at a discharge station after they have achieved the desired temperature for subsequent packing. The egg cooling conveyor comprises a conveying member which supports a series of uniformly spaced carrier members having spaced pockets therein adapted to receive a row of eggs. The carrier members are each mounted to the conveying member in a manner whereby the spacial orientation of the carrier members is maintained as they progress through the conveyor runs so that the eggs will not be damaged. The eggs are arranged to be delivered to the carrier members from a conventional roller conveyor by a method wherein the carriers are tilted toward the delivery conveyor at the delivery station while the row of eggs are dropped therein. Special resilient means may be arranged adjacent to the delivery station so that undue swinging movement of the carrier is prevented and so that the egg will not bounce or otherwise move out of its pocket once it is received on the carrier member. At the discharge station the carrier member is again tilted at the precise point where the row of eggs will be discharged onto a conventional roller conveyor. In order to assure that each egg is properly discharged, a pusher member may be used to successively move across each carrier member at the proper time to sweep all of the eggs therefrom.

It will be appreciated that with the egg cooling conveyor of the present invention, a means is provided whereby the eggs can be cooled from their temperature after gathering and washing (approximately 75° to 85°F.) to an acceptable temperature for packing (around 60° to 65°F.). This cooling can be accomplished over a time period of from 45 to 60 minutes so that no deteriorative effects occur as with the rapid egg cooling methods of the prior art. The egg cooling conveyor, which is a primary component of the present invention, is provided with a unique means whereby the eggs can by gently transferred onto a series of carrier members from conventional roller conveyors and whereby such eggs can be gently transferred off of such carrier members onto another set of conventional roller conveyors without cracking or otherwise damaging the eggs.

DESCRIPTION OF THE PREFERRED EMBODIMENT

Figure 1:
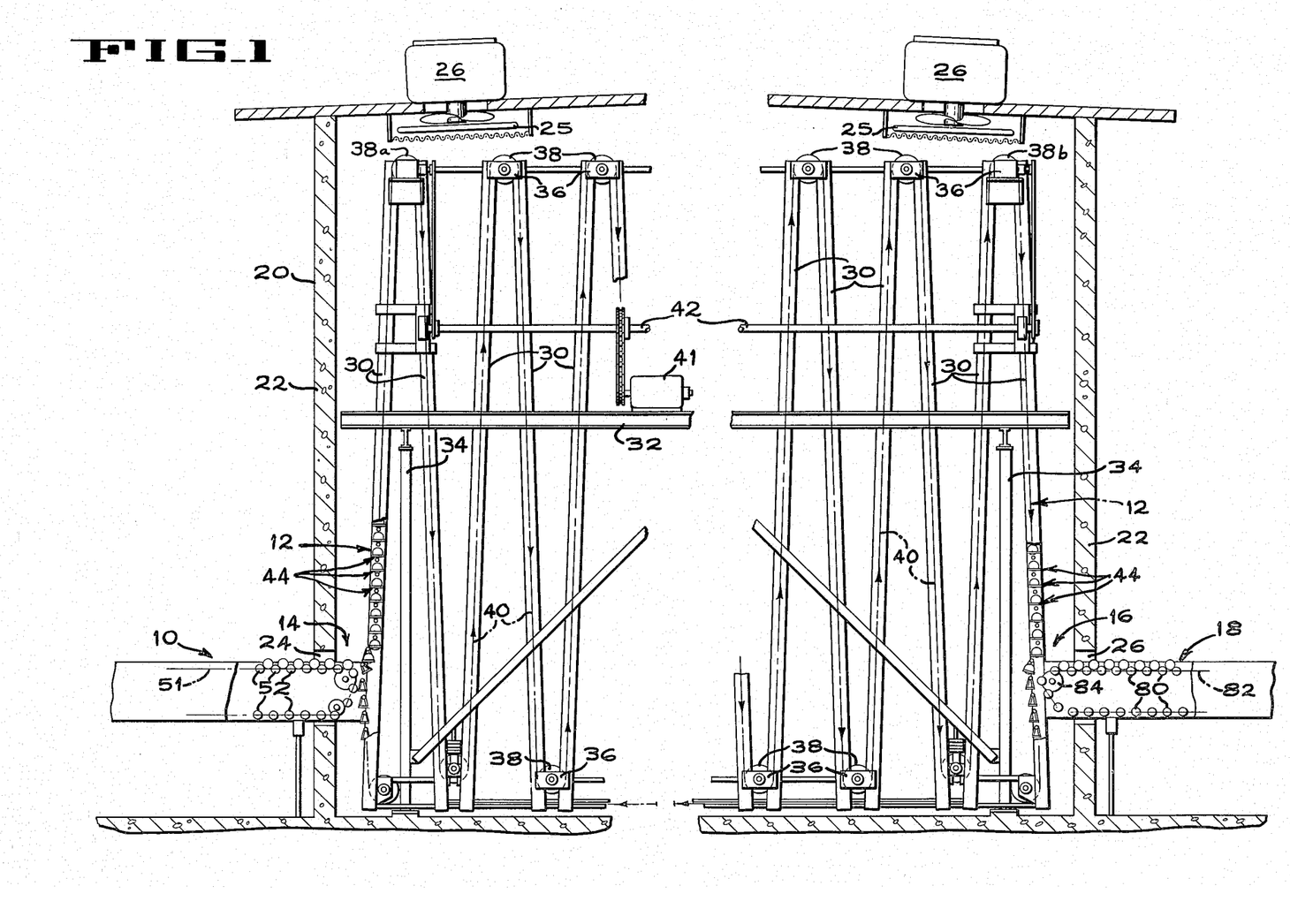
FIG. 1 is a diagrammatic side elevation of the egg cooling conveyor of the present invention, with parts thereof being broken away, particularly illustrating its arrangement within an enclosed cooling room and its association with a delivery conveyor and a take-away conveyor of the conventional grooved roller type.

Referring now more particularly to FIG. 1, it will be appreciated that the apparatus of the present invention is arranged to handle eggs at an elevated temperature which eggs are moved in parallel rows along a conventional delivery conveyor 10 of the conventional grooved roller type with such a conveyor being shown and described, for example, in the prior U.S. Pat. No. to Rose et al, 3,252,607. From this conveyor, the rows of eggs are successively transferred onto an egg cooling conveyor 12 which latter conveyor then carries the eggs through a series of generally vertical upward and downward movements from the delivery station 14 to a discharge station 16 wherein the eggs are transferred to a grooved roller conveyor 18 which may be of similar construction to the roller conveyor 10. The egg cooling conveyor 12 is mounted for operation entirely within a cooling room 20 defined by concrete walls 22 which provided with narrow openings 24 and 26 to accommodate the transfer conveyors 10 and 18, respectively. Conventional cooling coils 25 are provided adjacent the roof of the cooling room and motor-driven fans 26 are utilized to cause a general circulation of the air within the cooling room so that the eggs are subjected to a substantially continuous cooling temperature during their conveyance through the cooling room. It is important that rapid cooling of the eggs by forced drafts at low temperatures be avoided, and for the purposes of the present invention as aforedescribed, the desirable temperature in the cooling room should be set at approximately 50°F. although this temperature may be varied between about 45° and 60°F. depending upon the temperature of the eggs as they enter the room. The conveyor 12 should be of a length such that the eggs are in the cooling room for at least 30 minutes, and it is desirable that they remain in the room for 45 to 60 minutes.

As seen in FIG. 1, the egg cooling conveyor 12 generally comprises a frame structure including a pluraluty of sets of upright channel frame members 30 (only one set being shown) with the frame members of each set being tied together by a horizontally extending frame member 32 that is mounted upon posts 34 that are rigidly secured to the floor of the cooling room. The upper and lower ends of the frame members 30 are connected by support brackets 36 each of which rotatably supports a sprocket 38. Trained about each sprocket 38 is a continuous conveyor chain 40 (which is shown only diagrammatically in FIG. 1).

As pointed out hereinbefore, a second set of supporting frame members 30, 32 and 34 is arranged in transversely spaced relationship with the frame members shown in FIG. 1 to support for continuous movement a second conveyor chain 40. The conveyor chains are arranged to be continuously driven by a motor 41 which drives a shaft 42 that, in turn, is connected so as to directly drive the sprockets 38a and 38b at each upper end of the conveyor. Between each of the conveyor chains, as can best be seen from the isometric views of FIGS. 4 and 5, there are provided a plurality of spaced carrier members 44 which are each comprised of two rod-like members 44a and 44b which are arranged in parallel relationship and are bent inwardly and outwardly so as to provide six pockets for receiving each row of six eggs delivered from the delivery conveyor 10. The ends of each of the rod members 44a and 44b are provided with upturned end portions 45a and 45b, respectively, having outwardly directed ends 46a and 46b, respectively, which are secured together to a bushing 48 which is adapted to be rotatably mounted upon a pin 49 that extends outwardly from every third chain link in the adjacent conveyor chain 40. In order to protect the eggs from damage, all portions of the carrier members are coated with a thin layer of a resilient vinyl material.

As is clearly disclosed in the aforementioned U.S. Pat. No. 3,252,607 to Rose el al, the delivery conveyor 10 is comprised of a pair of parallel chains 51 (one only being shown in FIG. 2) having positioned therebetween at uniformly spaced intervals a series of grooved rollers 52 of rubber or similar resilient material with the eggs being adapted to be carried in the grooves, or pockets, provided between the rollers. At the discharged end of the delivery conveyor (FIG. 2), a star wheel 54 is rotatably mounted and includes a plurality of radially extending shoes 55 which are adapted to be received within the pockets between the rollers 52 so as to eject the eggs from the pockets at the terminal end of the upper run of the delivery conveyor.

Figures 2, 2A:
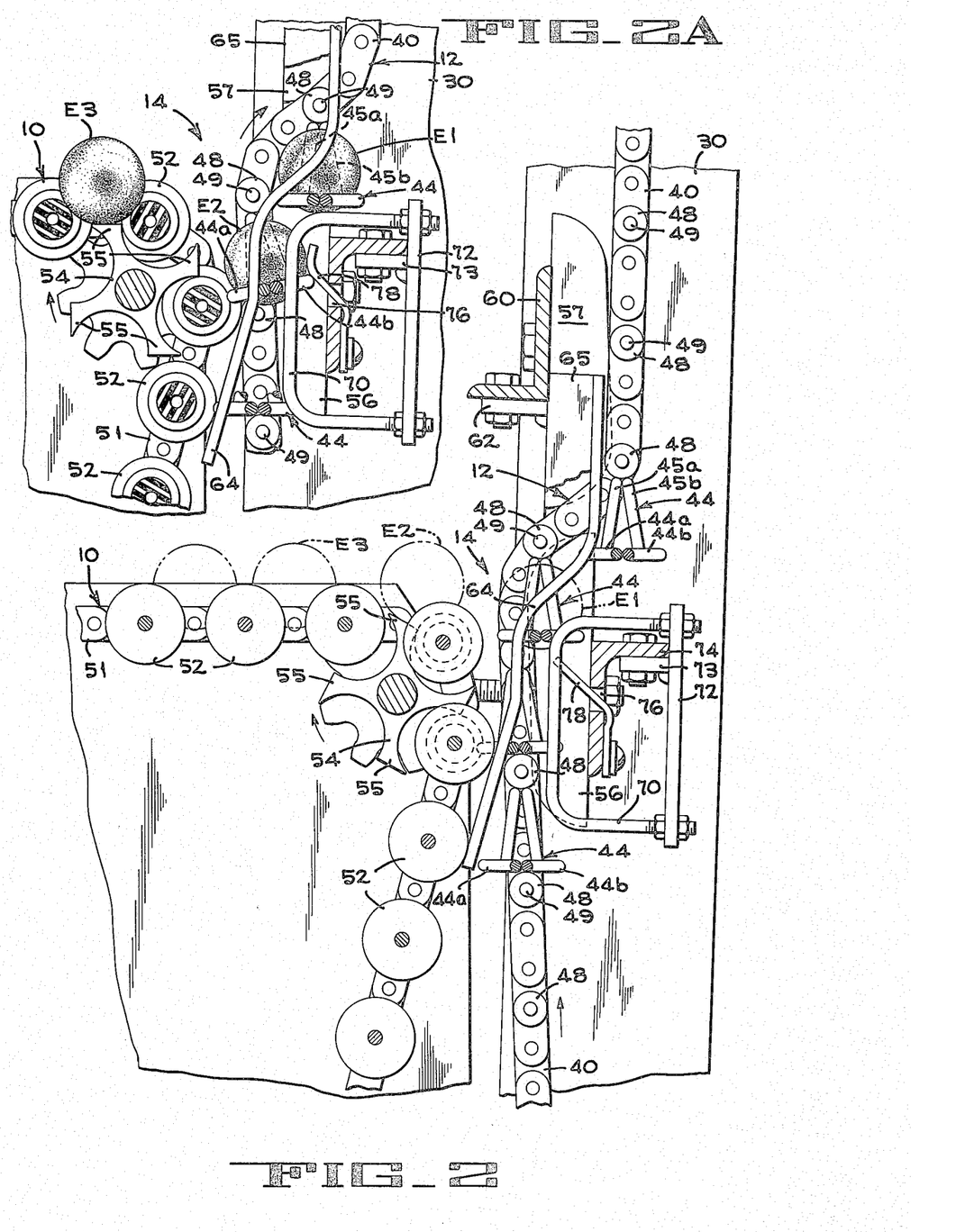
FIG. 2 is an enlarged vertical section taken at the delivery station of the egg cooling conveyor of FIG. 1.
FIG. 2A is a fragmentary vertical section similar to FIG. 2 but showing the operative mechanisms in a slightly advanced position wherein an egg has just been transferred onto a carrier member on the conveyor.
Figure 4:
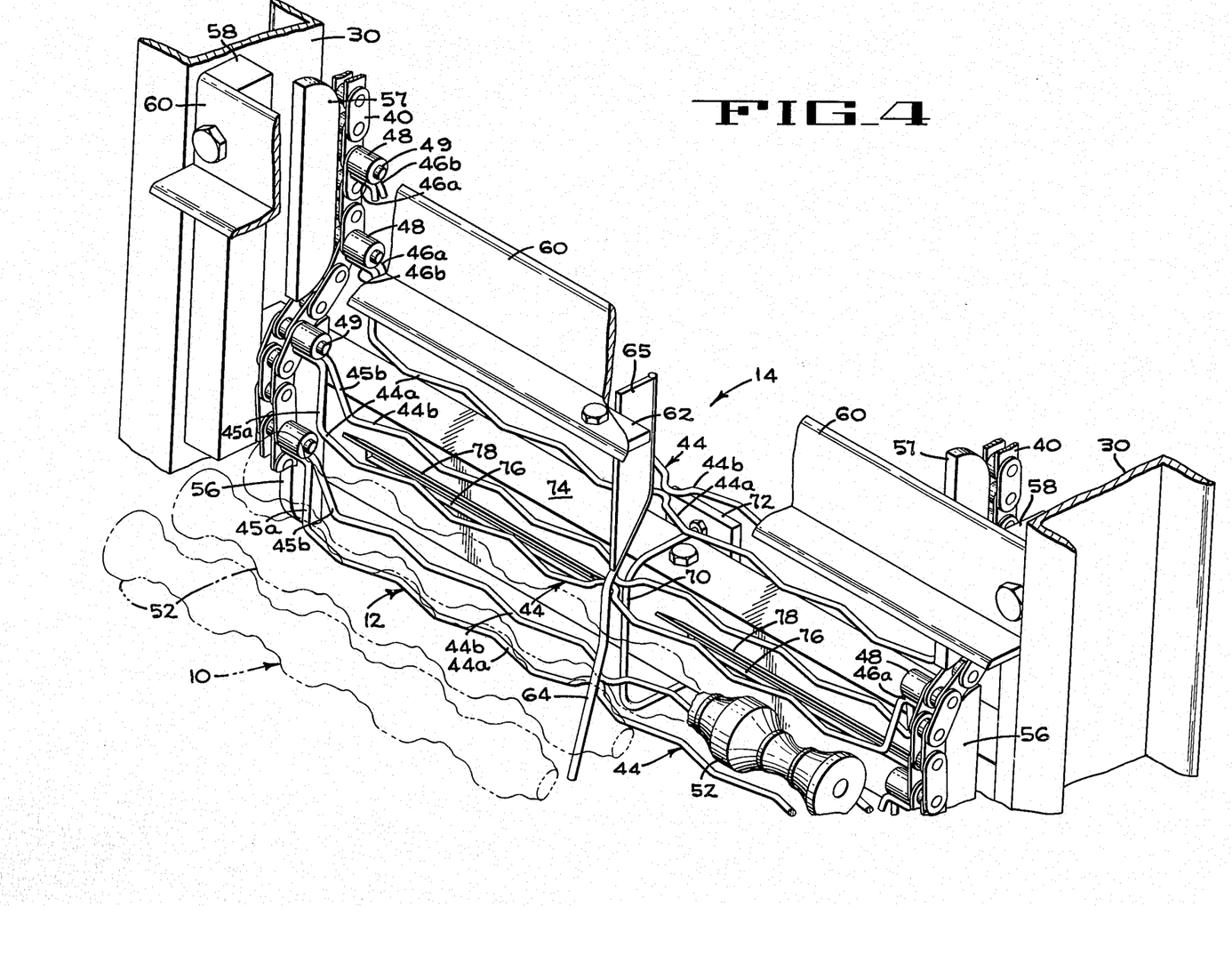
FIG. 4 is an isometric view of the delivery station as shown in FIG. 2.

As shown in FIGS. 2 and 4, the conveyor chains 40 of the egg cooling conveyor 12 are moved outwardly out of their normal upward vertical path so that the carrier members 44 will be urged toward the discharge end of the delivery conveyor 10 at the point where the eggs are discharged therefrom. In order to provide for this outward movement of the carrier members a pair of guide blocks 56 and 57 are secured in spaced relationship from each of the channel frame members 30 so that the side edges thereof engage and guide the chains in an offset path (as best seen in FIG. 2). A pair of mounting blocks 58 are also mounted upon each of the frame members 30 and an angle iron 60 is bolted to the blocks so as to extend across the width of the conveyor 12 (FIG. 4). At the center of the angle iron 60 there is bolted a support plate 62 to which there is attached a downwardly extending guide rod 64 that is secured to the plate 62 by means of a welded flange 65 at its upper portion. As particularly shown in FIG. 2, the guide rod 64 is curved outwardly toward the delivery conveyor 10 and then extends downwardly at an angle to the path of the conveyor chains 40. The inner edge of this guide rod at the lower end thereof is adapted to engage each of the carrier members 44 in the notch 47a (FIG. 4) at the center of the rod-like member 44a so as to cause the carrier members to tilt toward the delivery conveyor 10 as the carrier member is being moved upwardly at the egg delivery station. This causes the pockets in the carrier member to face generally in the direction in which the egg is delivered so that a gentle and secure transfer is provided. During the transfer movement of the eggs from the conveyor 10 to the carrier members 44, the carrier members are further guided by means of a U-shaped guide bar 70 which is positioned parallel to the guide rod 64 and which is adapted to be received within the central notch 47b of each of the carrier members at the inner side thereof so that the carrier members are prevented from swinging and thereby possibly discharging one or more eggs as they undergo their lateral movement at the egg transfer point. The guide rod 70 is bolted to a support plate 72 which is, in turn, attached to a mounting plate 73 that is bolted to an angle iron 74 extending between and being securely attached to each of the side frame members 30. Also attached to the angle iron 74 and extending through a pair of slots 76 therein are a pair of resilient rubber flaps 78. As shown in FIG. 2, the upper end of the flaps 78 are bent inwardly toward the delivery conveyor 10. This portion of each flap is adapted to be engaged by the inner end of each of the carrier members (see FIG. 2A) as the carrier members move by it at approximately the precise moment when the eggs are delivered into the carrier member so that the deflected end of the flap will help in preventing the eggs from moving out of the pockets in the carrier member.

The operation of the apparatus at the delivery station can be shown by comparing FIG. 2 with FIG. 2A which latter Figure shows the conveyors 10 and 12 in a slightly advanced position. As will be apparant from FIG. 2, the egg E1 has just been delivered to a carrier member 44, and the egg E2 is at the terminal end of the delivery conveyor 10 with a shoe 55 of the star wheel 54 being in a position to eject the egg. As the subsequent carrier member 44 moves upwardly it will be tilted by the guide rod 64 and the egg E2 will be dropped into the appropriate pocket on the carrier member when it is in the said tilted position. As shown in FIG. 2A, the resilient flaps 78 at this time are engaged by the inner end of the carrier member and extend above the carrier member so that the egg is prevented from bouncing out of the pockets therein. Also, as shown in FIG. 2A, the subsequent egg E3 will now be moved into a position where it will be discharge from the delivery conveyor to the next carrier member 44 which has begun to move upwardly between the guide rods 64 and 70.

Figures 3, 3A:
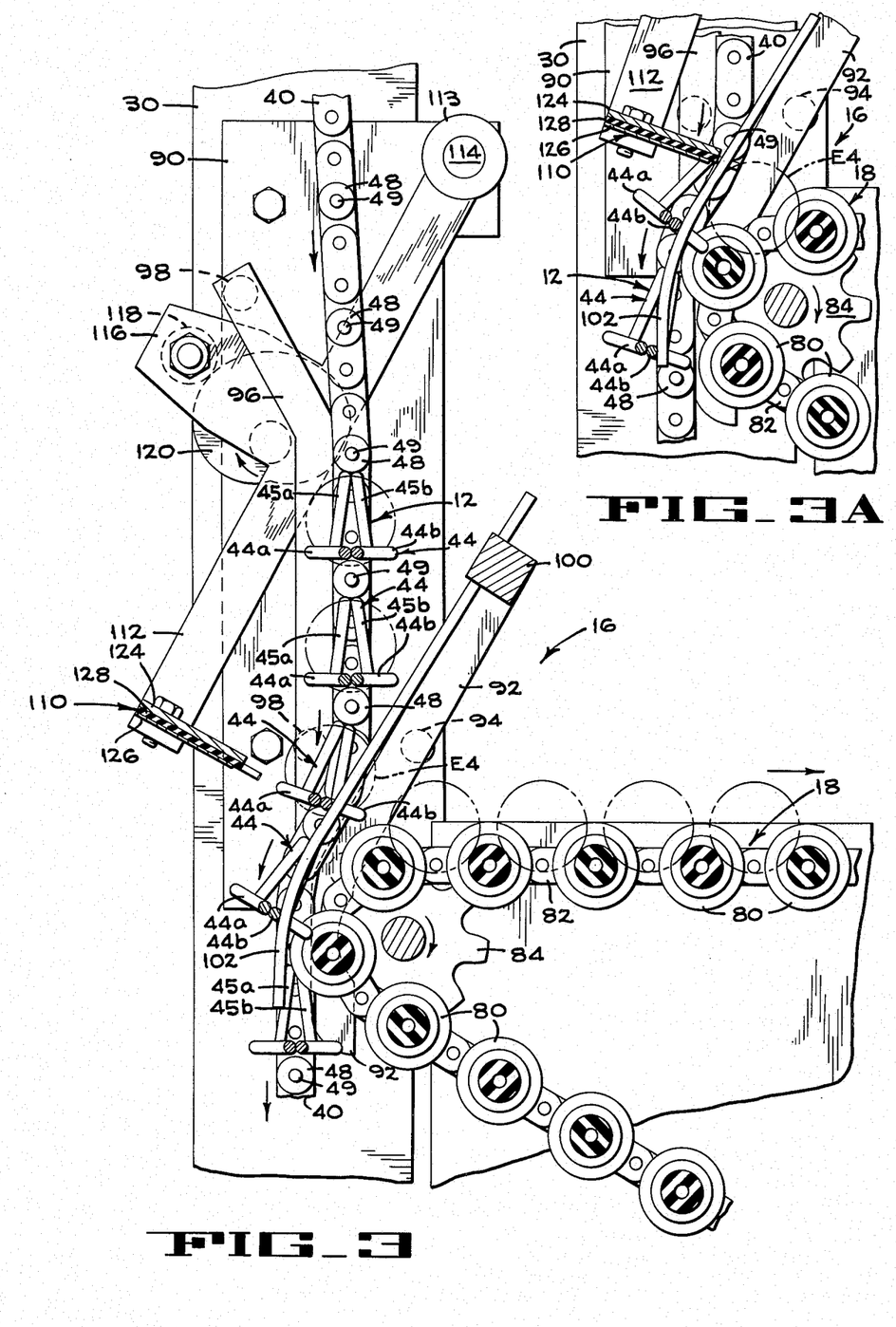
FIG. 3 is an enlarged vertical section taken at the discharge station of the egg cooling conveyor of FIG. 1.
FIG. 3A is a fragmentary vertical section similar to FIG. 3 but illustrating the operative mechanisms in a slightly advanced position wherein an egg has just been discharged from a carrier member to the take-away conveyor.
Figure 5:
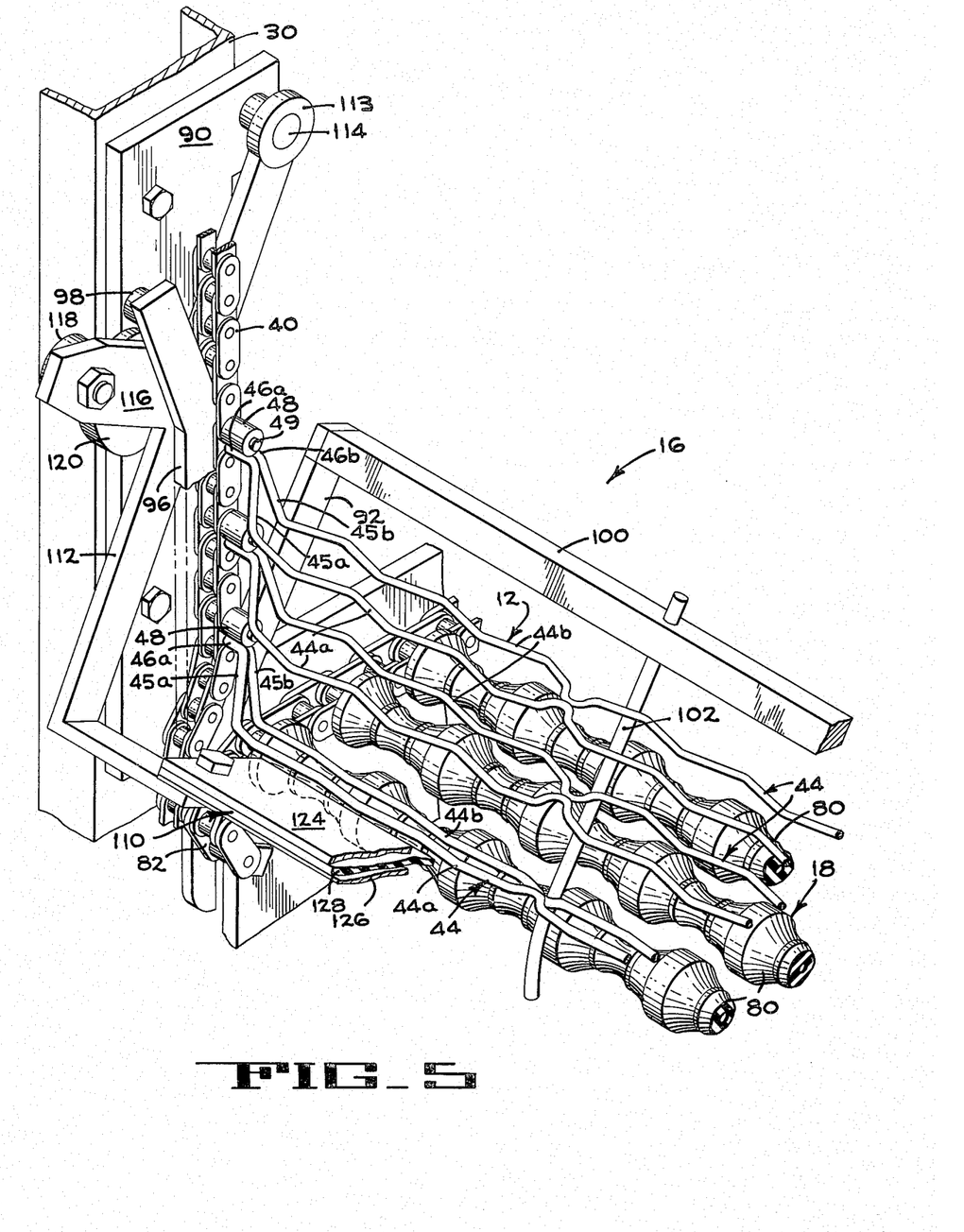
FIG. 5 is an isometric view of the discharge station as shown in FIG. 3.

The discharge end of the egg cooling conveyor 12 is particularly shown in FIG. 3 and FIG. 5. The take-away conveyor 18 is generally similar to the delivery conveyor 10 in that it includes a plurality of grooved rollers 80 of resilient material which are further disclosed in the aforementioned U.S Pat. No. 3,252,607 to Rose et al as mentioned hereinbefore. The conveyor chains 82 which carry the rollers 80 (one only being shown in FIG. 3) are trained about idler sprockets 84 so that the upper run of the conveyor 18 is initiated at a point directly adjacent to a downwardly moving run of the egg cooling conveyor 12.

In order to facilitate the transfer of eggs from the carrier members 44 on the egg cooling conveyor 12 to the pockets between the rollers 80 of the take-away conveyor 18, the conveyor chains 40 are deflected out of their normal generally vertical downward movement so that they move inwardly away from the end of the conveyor 18. In order to provide for this diverting movement of the conveyor chains a flat mounting plate 90 is bolted to the face of each of the support frame members 30 (one only being shown in FIG. 3 and FIG. 5). An angled guide plate 92 is secured to each of the support plates 90 by means of a spacer member 94 (FIG. 3) so that the adjacent conveyor chain 40 will engage the upper edge surface of the guide plate 92 and be diverted inwardly. A second angled guide plate 96 is also secured to each of the support plates 90 by means of a spacer member 98 so as to provide an edge surface for engaging the outer end of the adjacent chain 40 during its lateral movement in order to prevent fluctuations of the chain and to assure a smooth transfer of the eggs from the cooling conveyor. Positioned between each of the guide plates 92 and extending across the conveyor is a mounting bar 100 (FIG. 5) which is provided at the center thereof with a downwardly extending guide rod 102 that extends outwardly into the path of the downwardly descending carrier members 44. The guide rod 102 is adapted to be engaged in the notch 47b at the center of each of the rod-like members 44b as they move directly adjacent to the upper run of the take-away conveyor 18, as is shown in FIG. 3A. This causes the carrier members to tilt upwardly and otwardly so that the pockets thereof face the take-away conveyor and so that the eggs can be easily discharged therefrom.

To further aid in the discharge of the eggs from the carrier members 44, a pusher member 110 is provided for cyclical operation at the discharge station so that each row of eggs will be simultaneously pushed from the carrier members as they arrive at the precise discharge point. The pusher member 110 generally comprises a pair of mounting arms 112 each of which is rotatably secured to one of the mounting plates 90 adjacent to the sides of the conveyor by means of a hub 113 rotatably secured upon a pin 114 extending from the adjacent mounting plate 90. Each mounting arm 112 includes an outwardly extending ear 116 which has rotatably secured at the outer end thereof a cam follower roller 118. A cam 120 is rotatably secured to the mounting plate 90 and is adapted to be engaged by the cam follower so that the arms 112 are pivoted upwardly and inwardly and normally out of the path of the carrier members 44. The lower ends of each of the mounting arms 112 are turned inwardly toward each other and are adapted to secure therebetween a pair of flat plates 124 and 126 between which there is arranged a resilient abutment member 128 which extends toward the carrier members 44.

The cams 120 are adapted to be rotated (by means not shown) in synchronism with the movement of the conveyor chains 40 so that each cam makes one revolution in the time that it takes for a carrier member to travel the distance between adjacent carrier members on the conveyor. Thus the pusher member 110 will be caused to move inwardly once each cycle due to the unbalanced weight at the lower end thereof, and the timing of the cams are such that the abutment member 128 engages the rearward ends of the eggs at the exact moment when the carrier members 44 are tilted and the pockets between the rollers 80 of the take-away conveyor are in a position to receive the row of eggs. This discharging movement can be seen by comparing FIG. 3 with FIG. 3A the latter Figure being shown with the conveyors 12 and 18 in a slightly advanced position. In FIG. 3 the carrier member which carries the egg E4 has been received upon the guide rod 102 and is starting to tilt inwardly so that the pockets are facing toward the take-away conveyor 18. As the carrier slides down the face of the guide rod 102 it continues to tilt and the cams 120 (which are rotating in the direction of the arrow shown in FIG. 3) permit the pusher member 110 to move inwardly under the influence of gravity to push the egg E4 into the appropriate pocket between the rollers 80, as is shown in FIG. 3A. As the cams 120 continue to rotate the pusher member is brought outwardly away from the conveyor 12 to the position shown in FIG. 3 so that the subsequent carrier member 44 can move into a position where another row of eggs can be discharged to the take-away conveyor.

It will be apparent from the foregoing description that the egg cooling conveyor of the present invention is capable of moving rows of eggs continuously through a cooling room so that the eggs can be brought down to the proper temperature for packing. The conveyor moves continuously and is adapted to receive eggs continuously from a conventional roller conveyor and to discharge eggs continuously onto a conventional roller conveyor. Both the pickup and the discharge of the eggs is handled in a gentle fashion so that damage to the eggs will be prevented.

Although the best mode contemplated for carrying out the present invention has been herein shown and described, it will be apparent that modification and variation may be made without departing from what is regarded to be the subject matter of the invention.

The embodiments of the invention in which an exclusive property or privilege is claimed are defined as follows:

1. Apparatus for cooling eggs comprising first conveying means comprising a series of uniformly spaced rollers for conveying spaced rows of eggs in a generally horizontal plane, second conveying means for receiving said rows of eggs from said first conveying means and for conveying said eggs through a series of parallel vertical runs, said second conveying means including a plurality of uniformly spaced carrier members each having a plurality of pockets therein for receiving a row of eggs, means for mounting said carrier members to said conveying means so that they generally maintain a constant spacial orientation as they pass through said series of parallel runs, means for applying cooling air to the eggs while they are carried by said second conveying means, third conveying means comprising a series of uniformly spaced rollers for receiving said rows of eggs from said second conveying means and for conveying said eggs in a generally horizontal plane, means for gently delivering each row of eggs from said first conveying means to one of said carrier members of said second conveying means while said carrier member is moving vertically upwardly, and means for gently delivering said row of eggs from each of said carrier members to said third conveying means while said carrier member is moving vertically downwardly.

2. Apparatus for cooling eggs according to claim 1 wherein said means for delivering said rows of eggs from said first conveying means to said second conveying means comprises means for moving said carrier members laterally of their normal vertical path toward said first conveying means and for tilting said carriers members so that said pockets in said carrier members face toward said first conveying means, said first conveying means comprising an endless conveyor with said rows of eggs being arranged to be discharged from said first conveying means at the end of the upper run of said first conveying means and as the carrier members for receiving said rows of eggs are in their said tilted positions.

3. Apparatus for cooling eggs according to claim 2 including resilient means positioned adjacent the delivery point of said rows of eggs to said second conveying means to prevent said eggs from moving out of said pockets in said carrier members upon their reception therein.

4. Apparatus for cooling eggs according to claim 1 wherein said means for delivering said rows of eggs from each of said carrier members to said third conveying means comprises means for moving said carrier members laterally of their normal vertical path away from said third conveying means and for tilting said carrier members so that said pockets in said carrier members face toward said third conveying means, said third conveying means comprising an endless conveyor with said rows of eggs being arranged to be delivered to said third conveying means at the beginning of the upper run of said third conveying means and as the carrier members for delivering said rows of eggs are in their said tilted positions.

5. Apparatus for cooling eggs according to claim 4 including a pusher member for successively pushing said rows of eggs from said carrier members to said third conveying means while said carrier members are in their said tilted positions.

6. Apparatus for cooling eggs comprising endless conveying means for gently and mechanically receiving successive single rows of loose eggs and for conveying said eggs through a series of parallel runs extending in generally vertical planes, said conveying means including a plurality of uniformly spaced carrier members each having a plurality of pockets therein for receiving a single row of said eggs, means for mounting said carrier members to said conveying means so that they generally maintain a constant spacial orientation as they pass through said series of parallel runs, means for continuously driving said conveying means, means for applying cooling air to the eggs while they are passed through said series of parallel runs, and means for gently discharging the successive rows of eggs from said conveying means, said conveying means comprising a pair of parallel endless chains and each of said carrier members comprising a plurality of elongated rod members extending between said chains and having upturned end portions which are rotatably connected to and supported by said chains at their upper ends, said elongated rod members having bends therein to define said plurality of pockets with each pocket shaped to receive the periphery of an egg and retain the same therein.

7. Apparatus for cooling eggs as described in claim 6, wherein said elongated rod members have bends therein defining central notches, and guide means engageable with said central notches to tilt the carrier members for orienting said pockets and preventing the carrier members from swinging upon such orientation.

8. Apparatus for cooling eggs comprising endless conveying means for gently and mechanically receiving successive single rows of loose eggs and for conveying said eggs throUgh a series of substantially parallel runs that lie in generally vertical planes, said endless conveying means both receiving and discharging said eggs during its runs in generally vertical planes and including a plurality of uniformly spaced carrier members each having a plurality of spaced pockets therein for receiving a single row of said eggs, means for mounting said carrier members to said conveying means so that they generally maintain a constant spacial orientation as they pass through said series of parallel runs, means for continuously driving said conveying means, means for successively engaging and tilting each of said carrier members while it is moving vertically upwardly at the receiving end of said conveying means in order to facilitate the transfer of a row of eggs into said pockets, means for applying cooling air to the eggs while they are passed through said series of parallel runs, and means for gently discharging the successive rows of eggs from said conveying means.

9. Apparatus for cooling eggs according to claim 8 including means for successively tilting each of said carrier members while it is moving vertically downward at the discharge end of said conveying means so that said pockets therein face upwardly and outwardly of said conveying means in order to facilitate the transfer of a row of eggs out of said pockets.

10. Apparatus for cooling eggs according to claim 9, including a cyclically operated pusher member for pushing each of said eggs from its said pocket when said carrier member is in its tilted position.

11. A method of cooling eggs comprising the steps of gently mechanically delivering a single row of loose eggs moving continuously in a generally horizontal plane to a continuously upwardly moving carrier member having a plurality of pockets therein for receiving said eggs, each egg in said row being simultaneously delivered to said carrier member, continuously conveying said eggs and carrier member through a series of substantially parallel runs in an enclosed chamber while generally maintaining constant the spacial orientation of said carrier member, circulating cooling air within said enclosed chamber to cool said eggs, and gently mechanically discharging said row of eggs from said carrier member after they have passed through said series of parallel runs and while said carrier member is moving downwardly.

12. A method of cooling eggs according to claim 11 wherein said series of substantially parallel runs are in generally vertical planes.

13. A method of cooling eggs according to claim 12 wherein both said delivery of eggs to said carrier member and the discharge of eggs from said carrier member is accomplished by tilting said carrier member so that said pockets face in the direction of delivery to and discharge from said carrier member.

14. A method of cooling eggs according to claim 13 including the step of assisting in the discharge of said eggs by pushing them from said carrier member while it is in said tilted position.

15. A method of cooling eggs comprising the steps of gently mechanically delivering a single row of loose eggs to an upwardly moving carrier member having a plurality of pockets therein for receiving said eggs, conveying said eggs and carrier member through a series of substantially parallel runs in an enclosed chamber while generally maintaining constant the spacial orientation of said carrier member, circulating cooling air within said enclosed chamber to cool said eggs, and gently mechanically discharging said row of eggs from said carrier member after they have passed through said series of parallel runs and while said carrier member is moving downwardly, and wherein the temperature of said cooling air is maintained at between about 45° and about 60° and said eggs are conveyed within said chamber for a period of time of at least thirty minutes.

16. A method of cooling eggs according to claim 15 wherein the temperature of said cooling air is maintained at about 50° and said eggs are conveyed within said chamber for a period of time of between about 45 minutes and about 1 hour.

17. A method of cooling quantities of loose eggs comprising the steps of:
continuously advancing a transverse row of individual loose eggs in a generally horizontal plane of predetermined length while constraining each egg against rolling movement transversely of the direction of advance,
continuously intercepting said eggs at the end of said horizontal plane and thereafter advancing the eggs upwardly in a substantially vertical path,
continuously advancing each individual egg along a series of substantially vertical paths which are alternately upwardly moving and downwardly moving,
constraining each egg against rolling movement while advancing along said paths,
maintaining the spatial orientation of each egg substantially constant throughout its advancing movement,
gently and mechanically discharging each egg from vertical path during a final advancing movement thereof, and
circulating cooling air about said eggs during their movement along said vertical paths,
thereby cooling large numbers of individual eggs in a minimal space without use of boxes, flats or the like.

18. A method of cooling quantities of loose eggs as set forth in claim 17 wherein the temperature of said cooling air is maintained at between about 45° and about 60°F. and said eggs are conveyed within said chamber for a period of time of at least 30 minutes.

19. A method of cooling quantities of loose eggs as set forth in claim 18 wherein the temperature of said cooling air is maintained at about 50°F. and said eggs are conveyed within said chamber for a period of time of between about 45 minutes and about 1 hour.

* * * * *

UNITED STATES PATENT OFFICE
CERTIFICATE OF CORRECTION

PATENT NO. : 3,882,686
DATED : May 13, 1975
INVENTOR(S) : BOYD W. ROSE

It is certified that error appears in the above-identified patent and that said Letters Patent are hereby corrected as shown below:

Column 2, line 46, --by-- should be --be--.

Column 5, line 39, "discharge" should be --discharged--.

Column 8, line 61, "throUgh" should be --through--.

Column 10, line 10, "45°" should be --45°F.--.

Column 10, line 10, "60°" should be --60°F.--.

Column 10, line 15, "50°" should be --50°F.--.

Column 10, line 38, before "vertical" insert --a--.

Column 10, line 48, "45°" should be --45°F.--.

On the first page of the Letters Patent the Assignee was left out. Should be: --Assignee FMC Corporation, San Jose, Calif.--.

Signed and Sealed this seventeenth Day of February 1976

[SEAL]

Attest:

RUTH C. MASON
Attesting Officer

C. MARSHALL DANN
Commissioner of Patents and Trademarks